United States Patent
Vandekieft et al.

(10) Patent No.: US 11,671,551 B2
(45) Date of Patent: Jun. 6, 2023

(54) SYNCHRONIZATION OF MULTI-DEVICE IMAGE DATA USING MULTIMODAL SENSOR DATA

(71) Applicant: SONY GROUP CORPORATION, Tokyo (JP)

(72) Inventors: Jason Vandekieft, Madison, WI (US); Nikolaos Georgis, San Diego, CA (US); Chad Goolbis, Madison, WI (US)

(73) Assignee: SONY GROUP CORPORATION, Tokyo (JP)

( * ) Notice: Subject to any disclaimer, the term of this patent is extended or adjusted under 35 U.S.C. 154(b) by 64 days.

(21) Appl. No.: 17/328,920

(22) Filed: May 24, 2021

(65) Prior Publication Data

US 2022/0377208 A1 Nov. 24, 2022

(51) Int. Cl.
| | |
|---|---|
| *H04N 5/04* | (2006.01) |
| *G10L 25/18* | (2013.01) |
| *G10L 25/51* | (2013.01) |
| *G06F 18/22* | (2023.01) |
| *H04N 23/80* | (2023.01) |
| *H04N 23/90* | (2023.01) |

(52) U.S. Cl.
CPC .............. *H04N 5/04* (2013.01); *G06F 18/22* (2023.01); *G10L 25/18* (2013.01); *G10L 25/51* (2013.01); *H04N 23/80* (2023.01); *H04N 23/90* (2023.01)

(58) Field of Classification Search
CPC ...... H04N 5/04; H04N 5/23229; H04N 5/247; G06K 9/6201; G10L 25/18; G10L 25/51
See application file for complete search history.

(56) References Cited

U.S. PATENT DOCUMENTS

| | | | |
|---|---|---|---|
| 7,057,663 B1 | 6/2006 | Lee | |
| 10,192,087 B2 * | 1/2019 | Davis | ..................... G06V 10/30 |
| 10,382,680 B2 | 8/2019 | Polavarapu et al. | |
| 2005/0207672 A1 * | 9/2005 | Bernardo | ........... G01C 21/3848 |
| | | | 382/284 |

(Continued)

OTHER PUBLICATIONS

Jackson, et al., "3D for the people: multi-camera motion capture in the field with consumer-grade cameras and open source software", The Company of Biologist, National Center for Biotechnology Information(NCBI), vol. 5, No. 9, PMC5051647,Sep. 15, 2016, pp. 1334-1342.

*Primary Examiner* — Chiawei Chen
(74) *Attorney, Agent, or Firm* — Chip Law Group

(57) ABSTRACT

A method and system for synchronization of image data is provided. From a plurality of image-capture devices, image data including a plurality of image sequences is received. Each image sequence corresponds to one of the plurality of image-capture devices. A set of sensor data is further received from the plurality of image-capture devices. Each sensor data comprises at least one of an Inertial Measurement Unit (IMU) data and audio data. Based on the received set of sensor data, a match is determined between a first set of image frames of a first image sequence and a second set of image frames of a second image sequence. An offset is computed between the first set of image frames and the second set of image frames, based on the match and the first image sequence is synchronized with the second image sequence based on the computed offset.

20 Claims, 7 Drawing Sheets

(56) References Cited

U.S. PATENT DOCUMENTS

| | | | |
|---|---|---|---|
| 2010/0183280 A1* | 7/2010 | Beauregard | G11B 27/34 386/285 |
| 2012/0148149 A1* | 6/2012 | Kumar | G06V 10/7715 382/162 |
| 2014/0079372 A1* | 3/2014 | Zhang | G06V 10/764 386/E5.032 |
| 2014/0323105 A1* | 10/2014 | Pelton | H04W 4/02 455/414.1 |
| 2016/0037068 A1* | 2/2016 | Jenny | H04N 5/23229 348/36 |
| 2016/0189381 A1* | 6/2016 | Rhoads | G06T 7/33 382/103 |
| 2017/0264942 A1 | 9/2017 | Li et al. | |
| 2018/0144520 A1* | 5/2018 | Forutanpour | G06T 3/0018 |
| 2019/0364209 A1* | 11/2019 | Canfield | H04N 21/85406 |
| 2020/0036963 A1* | 1/2020 | Holzer | G06F 3/0485 |
| 2020/0154025 A1* | 5/2020 | Wakatsuki | H04N 5/232 |
| 2021/0216778 A1* | 7/2021 | Ramaswamy | G06V 10/811 |

\* cited by examiner

SYNCHRONIZATION OF MULTI-DEVICE IMAGE DATA USING MULTIMODAL SENSOR DATA

REFERENCE

None.

FIELD

Various embodiments of the disclosure relate to image or video synchronization for three-dimensional (3D) volumetric capture. More specifically, various embodiments of the disclosure relate to synchronization of multi-device image data using multimodal sensor data. Other embodiments are also disclosed.

BACKGROUND

Advancements in computing and imaging technology have paved the way for development of various techniques for 3D volumetric capture. Some of the techniques require a multi-camera setup. Typically, for an accurate volumetric capture, several cameras of the multi-camera setup may be triggered using trigger devices or software to simultaneously scan objects of interest from multiple viewpoints at the same. In some instances, several cameras may capture at slightly different frame rates or some of the cameras may be triggered at slightly different times due to delay introduced by individual trigger devices or software. In such instances, it may be a challenging task to obtain accurate synchronization of frames captured from multiple cameras. Without accurate synchronization across all cameras, it may be difficult to perform accurate 3D reconstruction, especially if the scanned objects are in motion. In many cases, expensive hardware has to be used to achieve this. A lower cost solution that may achieve frame accurate synchronization is required.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for synchronization of multi-device image data using multimodal sensor data, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for synchronization of multi-device image data using multimodal sensor data. The system may be configured to receive, from a plurality of image-capture devices, image data comprising a plurality of image sequences of at least a first object. Each image sequence of the plurality of image sequences may correspond to an image-capture device of the plurality of image-capture devices. A set of sensor data may be received from the plurality of image-capture devices. Each sensor data of the received set of sensor data may include at least one of an Inertial Measurement Unit (IMU) data and audio data. This data may be associated with a duration of acquisition of a corresponding image sequence of the plurality of image sequences. For example, while an image-capture device may acquire image frames within a 2 second shot, sensors inside the image-capture device may record the IMU data and/or audio data within the duration of the same 2 second shot. A match may be determined between a first set of image frames of a first image sequence (such as a first video clip) and a second set of image frames of a second image sequence (such as a second video clip), based on the received set of sensor data. Thereafter, an offset may be computed between the first set of image frames and the second set of image frames, based on the match. The first image sequence with the second image sequence may be synchronized based on the computed offset. After synchronization, for any given time-instant or duration, it may be possible to determine matching frames in each of the plurality of images sequences and to perform 3D reconstruction or other operations (such as to generate an immersive or 360 degree video) using such frames. Since the image sequences (or video feeds) from multiple image-capture devices are synchronized in post-capture stage, there may be no need of using any special-purpose or expensive hardware or software for synchronization.

Figure 1:
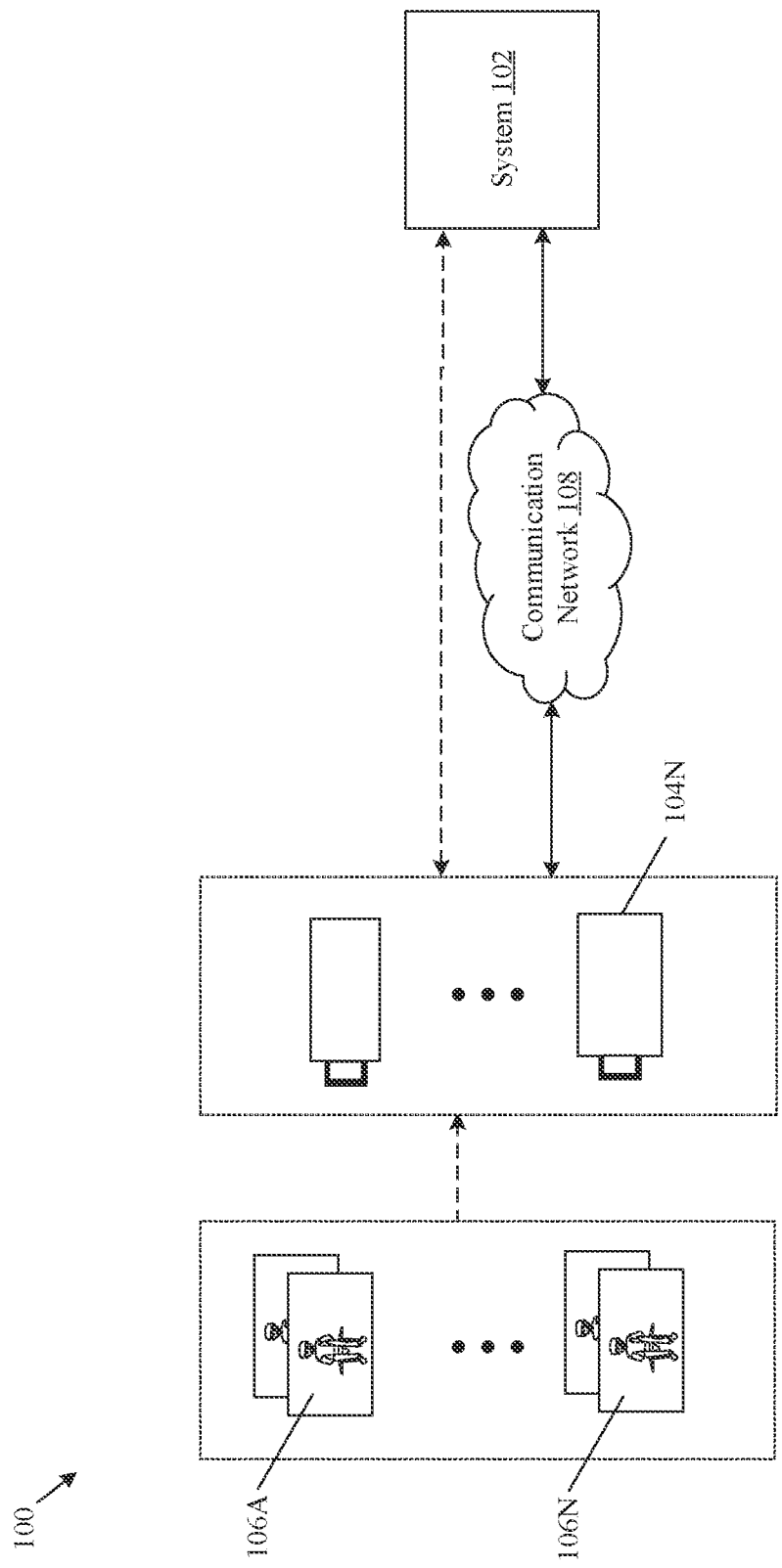
FIG. 1 is a diagram that illustrates an environment for synchronization of multi-device image data using multimodal sensor data, in accordance with an embodiment of the disclosure.

FIG. 1 is a diagram that illustrates an environment for synchronization of multi-device image data using multimodal sensor data, in accordance with an embodiment of the disclosure. With reference to FIG. 1, there is shown a diagram of an environment 100. The environment 100 may include a system 102 and a plurality of image-capture devices 104A . . . 104N, which may be directly coupled to the system 102 or may be coupled via a communication network 108.

The system 102 may include suitable logic, circuitry, and interfaces that may be configured to control the plurality of image-capture devices 104A . . . 104N to acquire a plurality of image sequences 106A . . . 106N from a corresponding plurality of viewpoints. The system 102 may receive the acquired image sequences 106A . . . 106N and may execute a workflow to temporally synchronize the received image sequences 106A . . . 106N. Examples of the system 102 may include, but are not limited to, a computing device, an image-capture device, a smartphone, a cellular phone, a mobile phone, a gaming device, a mainframe machine, a distributed computing system (such as an edge computing system), a computer work-station, and/or a consumer electronic (CE) device.

In an embodiment, the system 102 may include a server, which may be configured to store and synchronize the received image sequences 106A . . . 106N. The server may be implemented as a cloud server and may execute operations through web applications, cloud applications, HTTP requests, repository operations, file transfer, and the like. Other example implementations of the server may include, but are not limited to, a database server, a file server, a web server, a media server, an application server, a mainframe server, or a cloud computing server. In another embodiment, the system may be implemented as a plurality of distributed cloud-based resources by use of several technologies that are well known to those ordinarily skilled in the art.

The plurality of image-capture devices 104A . . . 104N may include suitable logic, circuitry, and interfaces that may be configured to acquire the plurality of image sequences 106A . . . 106N (such as videos) of at least a first object from a corresponding plurality of viewpoints. In an embodiment, the plurality of image-capture devices 104A . . . 104N may be mounted on a support structure of a multi-camera rig (for example, a dome-shaped cage structure). Examples of the image-capture device may include, but are not limited to, an image sensor, a wide-angle camera, an action camera, a closed-circuit television (CCTV) camera, a camcorder, a digital camera, a camera phone, a time-of-flight camera (ToF camera), a 360 degree camera, and/or other image-capture devices.

The communication network 108 may include a communication medium through which the system 102 and the plurality of image-capture devices 104A . . . 104N may communicate with each other. The communication network 108 may be one of a wired connection or a wireless connection or a combination thereof. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment may be configured to connect to the communication network 108 in accordance with various wired and wireless communication protocols or a combination of protocols including both wired protocols and wireless protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In a specific embodiment, the system 102 may be directly coupled to the plurality of image-capture devices 104A . . . 104N, via cables.

In operation, the system 102 may be configured to control the plurality of image-capture devices 104A . . . 104N to acquire the plurality of image sequences 106A . . . 106N. In an embodiment, the plurality of image-capture devices 104A . . . 104N may be mounted on a support structure of a multi-camera rig, which may be statically disposed in a recording environment. Each image-capture device may be placed at some distance from other image-capture devices and may be disposed to face the first object from a specific viewpoint. The plurality of image-capture devices 104A . . . 104N may be controlled through clock signals generated directly by the system 102 or generated by a multi-camera shutter controller. Such signals may configure and/or trigger the plurality of image-capture devices 104A . . . 104N to acquire the plurality of image sequences 106A . . . 106N for a first duration (for example, 2 seconds). The configuration may include, for example, a specific frame rate, a shutter speed, a trigger duration (or capture-duration), a sensor gain, and the like.

In an embodiment, the plurality of image-capture devices 104A . . . 104N may acquire images at a frame rate that is above a threshold (for example, 60 frames per second) and the shutter speed of each image-capture device may vary. In another embodiment, the plurality of image-capture devices 104A . . . 104N may acquire at a constant frame rate and the shutter speed of each image-capture device may be same. In an embodiment, each image-capture device may include an audio-capture device and an Inertial Measurement Unit (IMU) sensor unit. Within the first duration, each image-capture device may capture sensor data through the audio-capture device and the IMU sensor unit. In case the multi-camera rig remains static, the sensor data may include audio (in audible or inaudible range) from ambient environment and IMU data associated with floor vibrations in background.

Each of the plurality of image-capture devices 104A . . . 104N may be configured to transmit the acquired image sequence to the system 102 via the communication network 108. The system 102 in operation may be further configured to receive, from the plurality of image-capture devices 104A . . . 104N, image data that includes the plurality of image sequences 106A . . . 106N. Each image sequence of the plurality of image sequences may correspond to an image-capture device of the plurality of image-capture devices 104A . . . 104N.

The system 102 may be further configured to receive a set of sensor data from the plurality of image-capture devices 104A . . . 104N. Each sensor data of the received set of sensor data may include at least one of the IMU data (for example, gyro and/or accelerometer data) and/or audio data. The sensor data may be associated with the duration of acquisition of a corresponding image sequence of the plurality of image sequences 106A . . . 106N. In order to temporally synchronize the plurality of image sequences 106A . . . 106N, a pairwise frame matching operation may be executed iteratively to determine matches between the plurality of image sequences 106A . . . 106N, based on the received set of sensor data. For instance, the plurality of image sequences 106A . . . 106N may include a first image sequence 106A associated with a first image-capture device 104A and a second image sequence 106N associated with a second image-capture device 104N. The system 102 may be configured to determine a match between a first set of image frames of the first image sequence 106A and a second set of image frames of the second image sequence 106N. The match may be determined based on the received set of sensor data and may indicate that both the first set of images frames and the second set of images frames correspond to a common time-instant or duration (which may be within the duration of acquisition). Details of the match determination are provided in FIG. 5 and FIG. 6, for example.

The system 102 may be further configured to compute an offset between the first set of image frames and the second set of image frames, based on the match. The computed offset may correspond to a number of frames by which a positional identifier of a first image frame of the first set of image frames precedes or succeeds a positional identifier of a second frame of the second set of image frames. By way of example, and not limitation, the first set of image frames may include 100 frames which start from a frame position of "#10" and end at a frame position of "#110" in the first image sequence 106A (such as a first video clip from) and the second set of image frames may include 100 frames which start from a frame position of "#25" and end at a frame position "#125" in the second image sequence 106N (such as a second video clip from). The offset between the first set of image frames and the second set of image frames may be 15 frames.

The system 102 may be configured to synchronize the first image sequence 106A with the second image sequence 106N based on the computed offset. In an embodiment, the synchronization may include a shift in a positional identifier of the first set of image frames in the first image sequence 106A with respect to a positional identifier of the second set of image frames in the second image sequence. In case the first image sequence 106A and/or the second image sequence 106N are acquired at a higher frame rate (for example, 120 frames per second) than a required frame rate (for example, 60 frames per second), then a down-sampling of at least one of the first image sequence 106A or the second image sequence 106N may be executed. By way of example, and not limitation, the synchronization may include a down-sampling of at least one of the first image sequence 106A or the second image sequence 106N, such that a positional identifier of the first set of image frames matches with a positional identifier of the second set of image frames.

Figure 2:
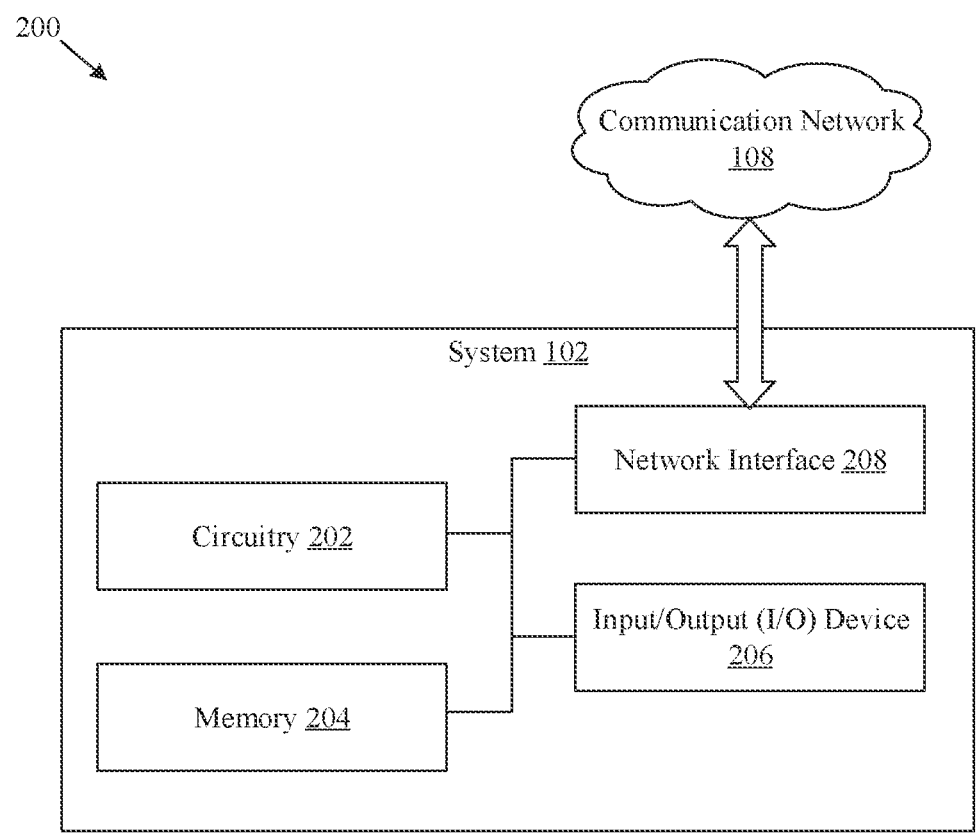
FIG. 2 is an exemplary block diagram of the system of FIG. 1, in accordance with an embodiment of the disclosure.

FIG. 2 is an exemplary block diagram of the system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, and a network interface 208. The network interface 208 may be connected to the communication network 108 (FIG. 1). The circuitry 202 may be communicatively coupled to the memory 204, the I/O device 206, and the network interface 208. In at least one embodiment, the system 102 may include provisions to acquire images/videos via the plurality of image-capture devices 104A . . . 104N and to allow the user to view the acquired images/videos and/or process the acquired image/video by application of certain operations on the acquired images/videos.

The circuitry 202 may include suitable logic, circuitry, and interfaces that may be configured to execute program instructions associated with different operations to be executed by the system 102 For example, one or more of such operations may be executed to trigger acquisition of an image sequence or video from each of the plurality of image-capture devices 104A . . . 104N. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), other control circuits and/or a combination thereof.

The memory 204 may include suitable logic, circuitry, and/or interfaces that may be configured to store the program instructions executable by the circuitry 202. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input form a user in conjunction with the plurality of image-capture devices 104A . . . 104N and to provide an output based on the received input. The I/O device 206 which may include various input and output components, which may be configured to communicate with the circuitry 202 or a processor (which may be part of the circuitry 202). Examples of the I/O device 206 may include, but are not limited to, a touch screen, a keyboard, a mouse, a joystick, a microphone, a display device, and a speaker.

The network interface 208 may include suitable logic, circuitry, interfaces, and/or code that may be configured to connect and communicate with a plurality of electronic devices, such as a computer, a smartphone, or a server. The network interface 208 is communicative coupled to the plurality of image-capture devices 104A . . . 104N via a communication network 108. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The functions or operations executed by the system 102, as described in FIG. 1, may be performed by the circuitry 202. Operations executed by the circuitry 202 are described in detail, for example, in FIGS. 3, 4, 5, and 6.

Figure 3:
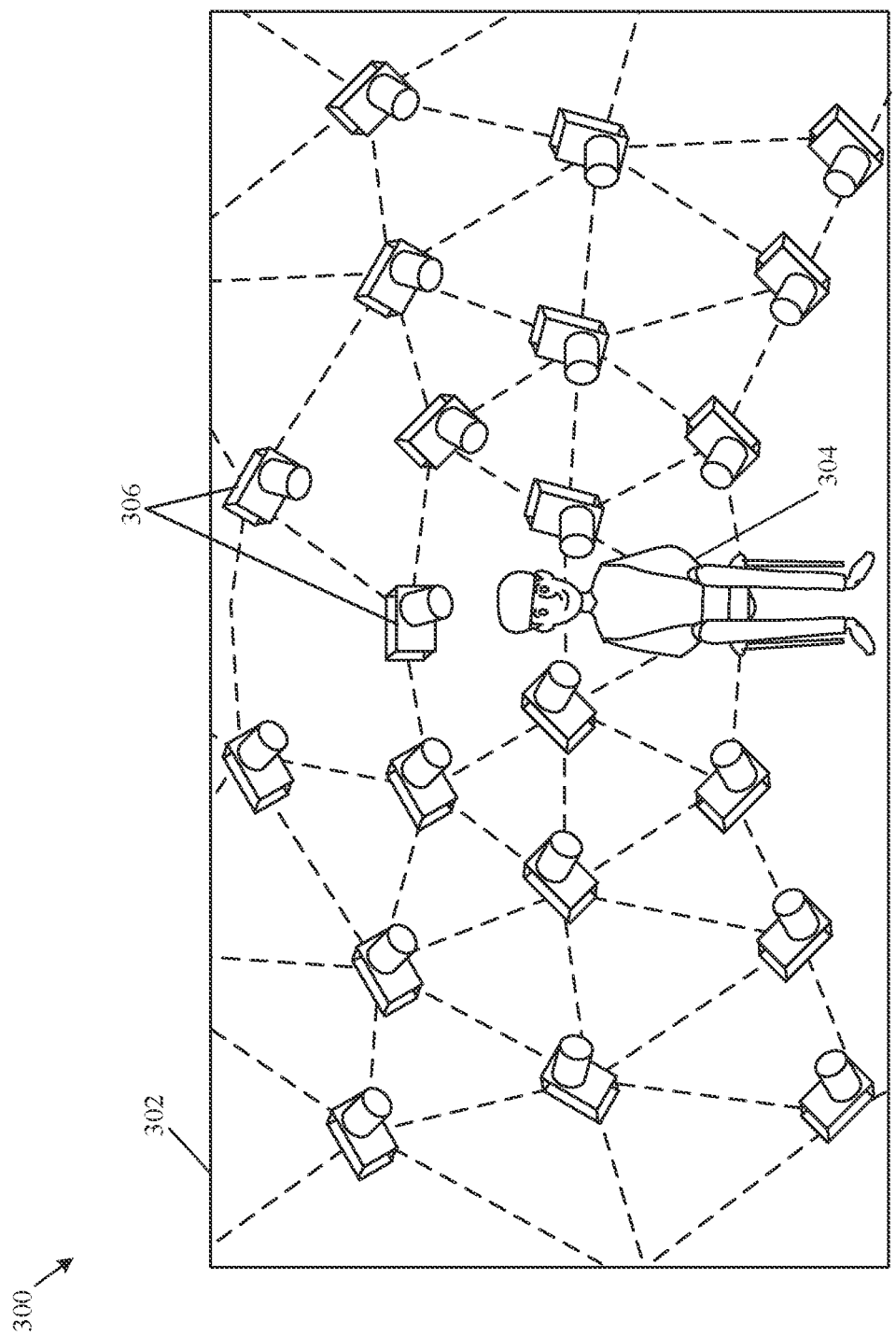
FIG. 3 is a diagram that illustrates an exemplary multi-camera rig that supports a plurality of image-capture devices, in accordance with an embodiment of the disclosure.
Figure 4:
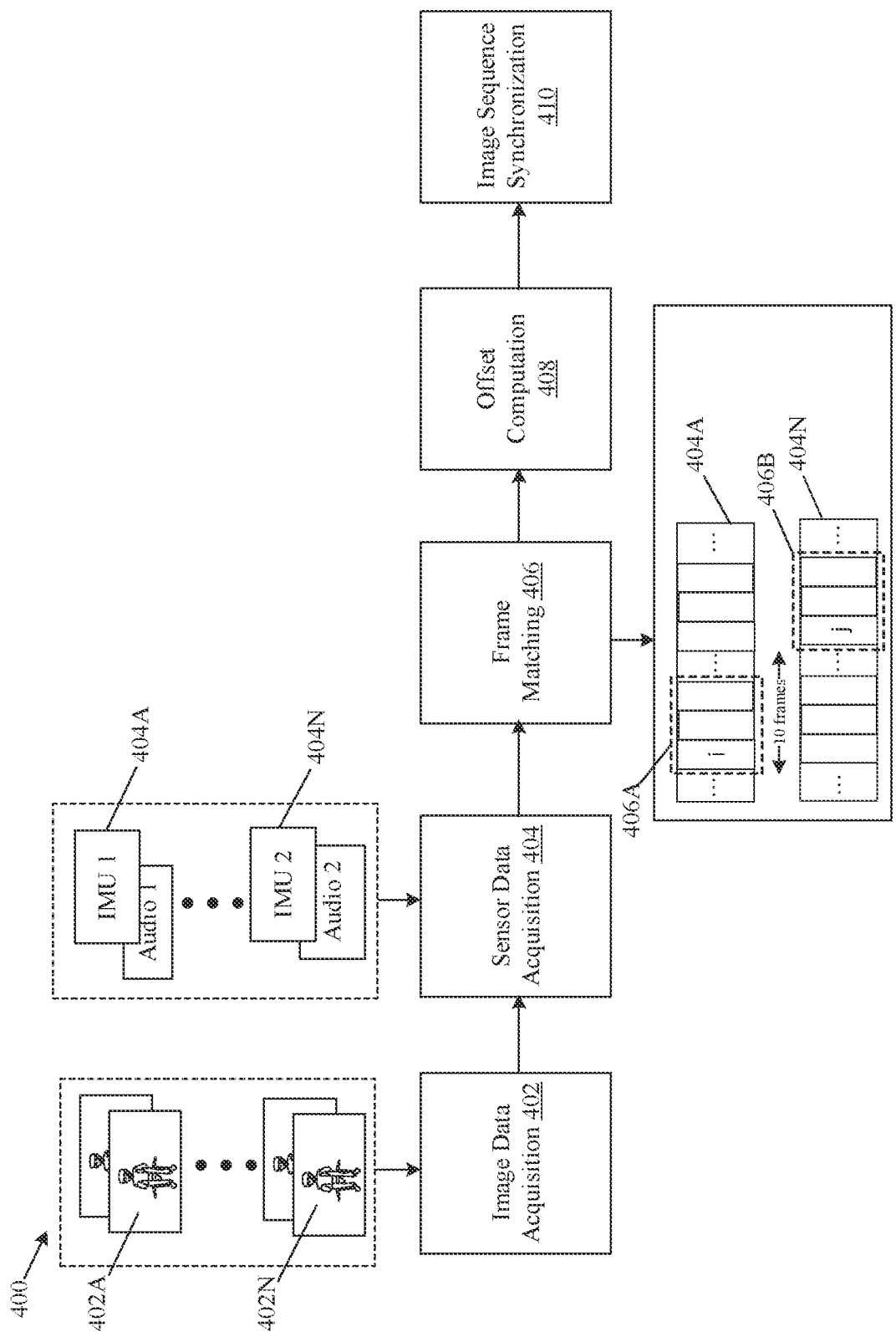
FIG. 4 is a diagram that illustrates an exemplary operations for synchronization of multi-device image data using multimodal sensor data, in accordance with an embodiment of the disclosure.

FIG. 3 is a diagram that illustrates an exemplary multi-camera rig that supports a plurality of image-capture devices, in accordance with an embodiment of the disclosure. FIG. 4 is explained in conjunction with elements from FIG. 1, FIG. 2, and FIG. 3. With reference to FIG. 3, there is shown a diagram 300 that includes a multi-camera rig 302 in the shape of a dome. A person 304 is shown sitting on chair and the multi-camera rig 302 surrounds the person 304. The multi-camera rig 302 may include a support structure (as shown, for example, a caged dome structure) on which a plurality of image-capture devices 306 may be mounted. The multi-camera rig 302 may be positioned around object(s) (such as the person 304) whose images/videos (i.e. an image sequence) may have to be acquired and processed for volumetric-capture and 3D reconstruction. In an embodiment, the multi-camera rig 302 may include a rig controller which may be communicatively coupled to the system 102. In addition, each of the plurality of image-capture devices 306 on the multi-camera rig 302 may be communicatively coupled to the system 102. In an embodiment, the multi-camera rig 302 may be a static rig and the plurality of image-capture devices 306 may remain fixed on the multi-camera rig 302. In operation, the relative distance between every pair of image-capture devices (of the plurality of image-capture devices 306) may remain constant.

It should be noted that the multi-camera rig 302 in FIG. 3 is presented merely as an example and should not be construed as limiting for the disclosure. The present disclosure may be also applicable to other types of multi-camera rigs, such as a cuboidal-shaped cage-like rig. It should be further noted that the person shown in FIG. 3 is merely an example of a first object of interest for volumetric capture. The present disclosure may be applicable to other object types and sceneries (for example, a play that may be recorded in a studio setup). A description of other types of objects or sceneries has been omitted from the disclosure for the sake of brevity.

FIG. 4 is a block diagram that illustrates an exemplary operations for synchronization of multi-device image data using multimodal sensor data, in accordance with an embodiment of the disclosure. FIG. 4 is explained in conjunction with elements from FIG. 1, FIG. 2, and FIG. 3. With reference to FIG. 4, there is shown a block diagram 400 that illustrates an exemplary operations from 402 to 410, as described herein. The exemplary operations illustrated in the block diagram 400 may start at 402 and may be performed by any computing system, apparatus, or device, such as by the system 102 of FIG. 1 or FIG. 2. Although illustrated with discrete blocks, the exemplary operations associated with one or more blocks of the block diagram 400 may be divided into additional blocks, combined into fewer blocks, or eliminated, depending on the particular implementation.

At 402, image data may be acquired. In an embodiment, the circuitry 202 may be configured to acquire the image data of at least one object from the plurality of image-capture devices 104A . . . 104N. The image data may include a plurality of image sequences 402A . . . 402N, each of which may correspond to an image-capture device of the plurality of image-capture device 104A . . . 104N. Each image sequence (or a video) may include at least a first object from a specific viewpoint (in terms of camera position and orientation in 3D space).

At 404, sensor data may be acquired. In an embodiment, the circuitry 202 may be configured to acquire a set of sensor data 404A . . . 404N from the plurality of image-capture devices 104A . . . 104N. The set of sensor data 404A . . . 404N may correspond to a duration of acquisition of a corresponding image sequence of the plurality of image sequences 402A . . . 402N. For example, if the first image-capture device 104A acquires a first image sequence 402A within a duration of 2 seconds and at a frame rate of 120 frames per second, then the sensor data 404A from the first image-capture device 104A may correspond to the same duration of 2 seconds. Each sensor data of the set of sensor data 404A . . . 404N may be acquired from a corresponding image-capture device and may include at least one of IMU data and/or audio data. In case no audio is present in the background, the sensor data may include only the IMU data associated with floor vibrations. In case floor vibrations are absent, the sensor data may include the audio present in the background. In case both background audio and floor vibrations are absent, a preset audio may be played in the background and each of the set of sensor data 404A . . . 404N may include the preset audio.

At 406, a frame matching operation may be executed. The frame matching operation may be executed iteratively to match image frames within every pair of image sequences (or videos) acquired by a corresponding pair of image-capture devices. The execution may be based on the sensor data associated with each image-capture device in the pair of image-capture devices. As part of the frame matching operation, the circuitry 202 may be configured to determine A match between a first set of image frames 406A of a first image sequence 402A and a second set of image frames 406B of a second image sequence 402N. The match may be determined based on the received set of sensor data 404A . . . 404N from the plurality of image-capture devices 104A . . . 104N. Details of the frame-matching operation are provided in FIGS. 5 and 6, for example.

At 408, an offset may be computed between the first set of image frames 406A and the second set of image frames 406B. The circuitry 202 may be configured to compute the offset between the first set of image frames 406A and the second set of image frames 406B, based on the match. In an embodiment, the computed offset may correspond to a number of frames by which a positional identifier of a first image frame of the first set of image frames 406A precedes or succeeds a positional identifier of a second frame of the second set of image frames 406B. As shown, for example, the number of frames between a first frame (i) of the first set of image frames 406A and a first frame (j) of the second set of image frames 406B is 10 frames (which may be the offset).

At 410, the first image sequence 402A may be synchronized with the second image sequence 402N. In an embodiment, the circuitry 202 may be configured to synchronize the first image sequence 402A with the second image sequence 402N based on the computed offset. The synchronization may include a shift in a positional identifier of the first set of image frames 406A in the first image sequence 402A with respect to a positional identifier of the second set of image frames 406B in the second image sequence 402N. In another embodiment, the synchronization may include a down-sampling of at least one of the first image sequence 402A or the second image sequence 402N, such that a positional identifier of the first set of image frames 406A in the down-sampled first image sequence 402A matches with a positional identifier of the second set of image frames 406B in the second image sequence 402N (or down-sampled second image sequence).

It should be noted that operations from 406 to 410 may be repeated for each of the plurality of image sequences 402A . . . 402N in a pairwise manner. After synchronization, it may be possible to refer all matching frames (such as the first set of image frames 406A and the second set of image frames 406B) to a common time-instant or duration. By way of example, and not limitation, the circuitry 202 may receive an input that may include a first time-instant (for example, t=00:00:05) or a first duration (for example, t=00:00:05-00:00:07) within the duration of acquisition of the plurality of image sequences 402A . . . 402N. For instance, 00:00:00 may be considered as a second time-instant at which the acquisition started. Based on the input, the circuitry 202 may be configured to select, from each of the plurality of image sequences 402A . . . 402N, all matching frames (such as the first set of image frames 406A and the second set of image frames 406B) which correspond to the first time-instant (for example, t=00:00:05) or the first duration (for example, t=00:00:05-00:00:07).

In an embodiment, based on the synchronization, the circuitry 202 may be configured to apply a 3D reconstruction method on each of the synchronized plurality of image sequences (or videos) to reconstruct a static or a dynamic 3D scan of at least the first object (for example, the person of FIG. 3). The 3D reconstruction may be, for example, a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

Figure 5:
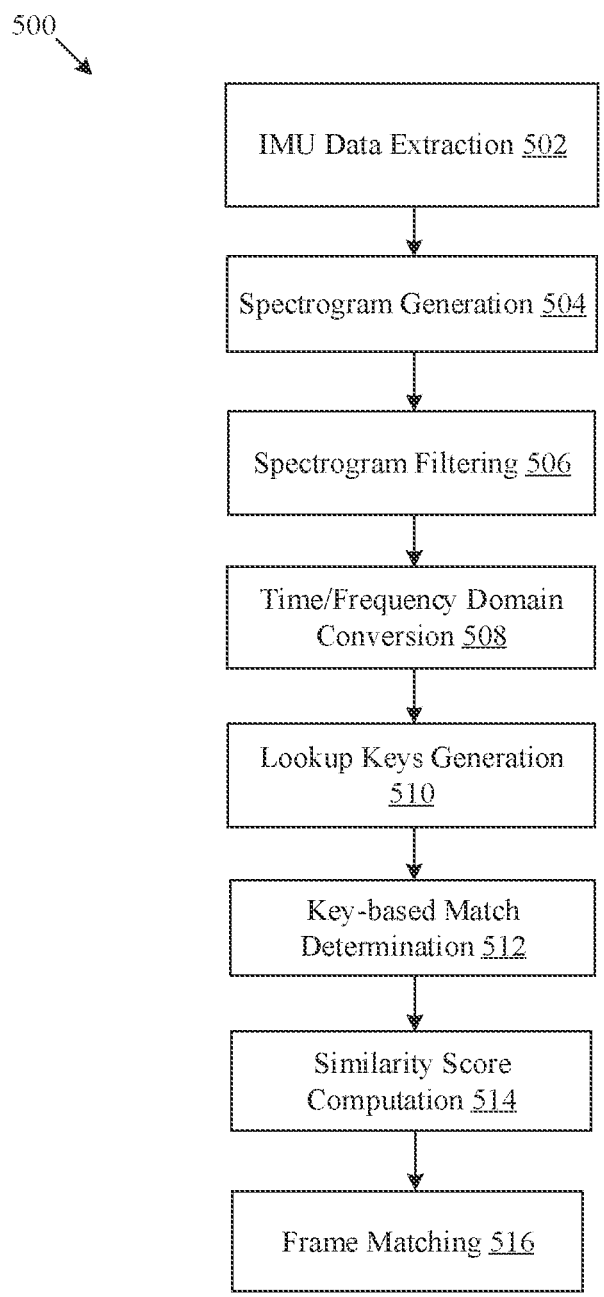
FIG. 5 is a diagram that illustrates an exemplary operations for determination of a match between images frames of multiple image sequences based on IMU data, in accordance with an embodiment of the disclosure.

FIG. 5 is a diagram that illustrates an exemplary operations for determination of a match between images frames of multiple image sequences based on audio data, in accordance with an embodiment of the disclosure. FIG. 5 is explained in conjunction with elements from FIG. 1, FIG. 2, FIG. 3, and FIG. 4. With reference to FIG. 5, there is shown a block diagram 500 that illustrates an exemplary operations from 502 to 516, as described herein. The exemplary operations illustrated in the block diagram 500 may start at 502 and may be performed by any computing system, apparatus, or device, such as by the system 102 of FIG. 1 or FIG. 2. Although illustrated with discrete blocks, the exemplary operations associated with one or more blocks of the block diagram 500 may be divided into additional blocks, combined into fewer blocks, or eliminated, depending on the particular implementation.

At 502, IMU data may be extracted from a set of sensor data (received at 404, for example). In an embodiment, from the received set of sensor data, the circuitry 202 may extract first IMU data and second IMU data corresponding to the first image sequence and the second image sequence, respectively. The extracted IMU data may include accelerometer data or gyro data associated with background vibrations (such as floor vibrations), which may be caused by activities in the surrounding environment.

At 504, a spectrogram of the extracted IMU data may be generated. In an embodiment, the circuitry 202 may generate a first spectrogram of the first IMU data and a second spectrogram of the second IMU data.

At 506, the spectrograms generated at 504 may be filtered. In an embodiment, the circuitry 202 may be configured to filter the generated first spectrogram based on a first two-dimensional (2D) diamond kernel or a first masked max filter to generate a first filter result. Similarly, the generated second spectrogram may be filtered based on the first 2D diamond kernel or the first masked max filter to generate a second filter result.

At 508, the filtered spectrograms may be converted into time/frequency domain lists. In an embodiment, the circuitry 202 may be configured to convert the first filter result to a first list of one of time-domain or frequency-domain values. Similarly, the circuitry 202 may be configured to convert the second filter result to a second list of one of time-domain or frequency-domain values.

At 510, lookup keys may be generated. In an embodiment, the circuitry 202 may be configured to generate a first lookup key with first offset values to neighboring list elements of the first list. Similarly, the circuitry 202 may generate a second lookup key with second offset values to neighboring list elements of the second list.

At 512, key-based matches between the generated lookup keys may be determined. In an embodiment, the circuitry 202 may be configured to determine first key-based matches between the generated first lookup key with first offset values and the generated second lookup key with second offset values. Methods of key-based matching may be similar to techniques used in digital watermarking. Such methods may be known to one skilled in the art. Therefore, a description of such methods is omitted from the disclosure for the sake of brevity.

At 514, a similarity score may be computed between images of the first image sequence and the second image sequence. In an embodiment, the circuitry 202 may be configured to compute a first similarity score for a pair of the first set of image frames and the second set of image frames. The first similarity score may be computed based on the determined first key-based matches. The higher the key-based matches, the higher the similarity score for the pair of the first set of image frames and the second set of image frames. Similarity score between lookup keys may be computed based on a suitable similarity technique. For example, K-Nearest-Neighbors uses similarity to classify new data points or values. K-Means may be a clustering technique which uses Euclidean distance to compute the distance between the cluster centroids and it's assigned data points or values. Other similarity based techniques may include, for example, Pearson's correlation, Spearman's correlation, Kendall's Tau, Cosine similarity, Jaccard similarity, and the like. These techniques may be well known to a person of ordinarily skilled in the art. Therefore, a description of such techniques has been omitted from discussion for the sake of brevity.

At 516, a frame matching operation may be executed. The frame matching operation may be executed iteratively to match image frames within every pair of image sequences (or videos) acquired by a corresponding pair of image-capture devices. As part of the operation, the circuitry 202 may determine a match between the first set of image frames and the second set of image frames based on a determination that the computed first similarity score is above a threshold (for example, 0.9 or above).

Figure 6:
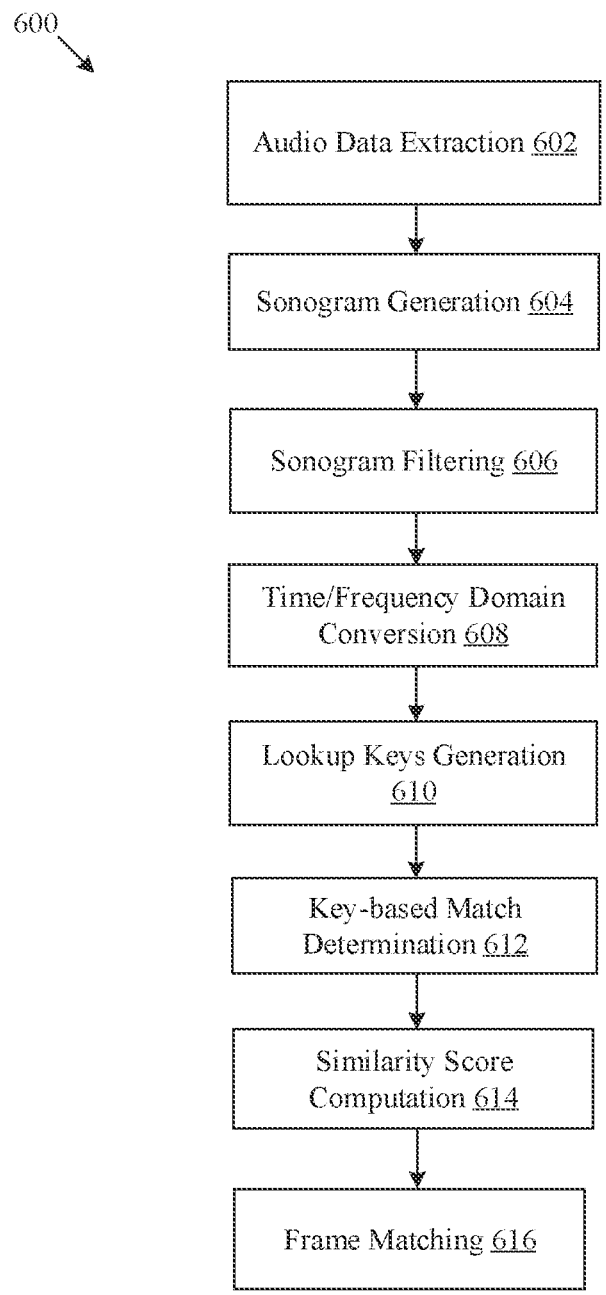
FIG. 6 is a diagram that illustrates an exemplary operations for determination of a match between images frames of multiple image sequences based on audio data, in accordance with an embodiment of the disclosure.

FIG. 6 is a diagram that illustrates an exemplary operations for determination of a match between images frames of multiple image sequences based on audio data, in accordance with an embodiment of the disclosure. FIG. 6 is explained in conjunction with elements from FIG. 1, FIG. 2, FIG. 3, FIG. 4, and FIG. 5. With reference to FIG. 6, there is shown a block diagram 600 that illustrates an exemplary operations from 602 to 616, as described herein. The exemplary operations illustrated in the block diagram 600 may start at 602 and may be performed by any computing system, apparatus, or device, such as by the system 102 of FIG. 1 or FIG. 2. Although illustrated with discrete blocks, the exemplary operations associated with one or more blocks of the block diagram 600 may be divided into additional blocks, combined into fewer blocks, or eliminated, depending on the particular implementation.

At 602, audio data may be extracted from a set of sensor data (received at 404, for example). In an embodiment, from the received set of sensor data, the circuitry 202 may extract first audio data and second audio data corresponding to the first image sequence and the second image sequence, respectively. The extracted audio data may include an audible sound, an inaudible sound, or a noise that may be present in the ambient environment. For example, if vehicular traffic is close to a studio setup which houses the plurality of image-capture devices, then the sound from the vehicular traffic may be captured by each of the plurality of image-capture devices.

At 604, sonograms of the extracted audio data may be generated. In an embodiment, the circuitry 202 may generate a first sonogram of the first audio data and a second sonogram of the second audio data.

At 606, the sonograms generated at 604 may be filtered. In an embodiment, the circuitry 202 may be configured to filter the generated first sonogram based on a second 2D diamond kernel or a second masked max filter to generate a third filter result. The second 2D diamond kernel or the second masked max filter may be different from the first 2D diamond kernel or the first masked max filter. Similarly, the generated second sonogram may be filtered based on the second 2D diamond kernel or the second masked max filter to generate a fourth filter result.

At 608, the filtered sonograms may be converted into time/frequency domain lists. In an embodiment, the circuitry 202 may be configured to convert the third filter result to a third list of one of time-domain or frequency-domain values. Similarly, the circuitry 202 may be configured to convert the fourth filter result to a fourth list of one of time-domain or frequency-domain values.

At 610, lookup keys may be generated. In an embodiment, the circuitry 202 may be configured to generate a third lookup key with third offset values to neighboring list elements of the third list. Similarly, the circuitry 202 may generate a fourth lookup key with fourth offset values to neighboring list elements of the fourth list.

At 612, key-based matches between the generated lookup keys may be determined. In an embodiment, the circuitry 202 may be configured to determine second key-based matches between the generated third lookup key with third offset values and the generated fourth lookup key with fourth offset values. Methods of key-based matching may be similar to techniques used in digital watermarking. Such methods may be known to one skilled in the art. Therefore, a description of such methods is omitted from the disclosure for the sake of brevity.

At 614, a similarity score may be computed between images of the first image sequence and the second image sequence. In an embodiment, the circuitry 202 may be configured to compute a second similarity score for a pair of the first set of image frames and the second set of image frames. The second similarity score may be computed based on the determined second key-based matches. Higher the key-based matches, higher may be the similarity score for the pair of the first set of image frames and the second set of image frames. Similarity score between lookup keys may be computed based on a suitable similarity technique. For example, K-Nearest-Neighbors may use similarity to classify new data points or values. K-Means may be a clustering technique which uses Euclidean distance to compute the distance between the cluster centroids and it's assigned data points or values. Other similarity based techniques may include, for example, Pearson's correlation, Spearman's correlation, Kendall's Tau, Cosine similarity, Jaccard similarity, and the like. These techniques may be well known to a person of ordinarily skilled in the art. Therefore, a description of such techniques has been omitted from discussion for the sake of brevity.

At 616, a frame matching operation may be executed. The frame matching operation may be executed iteratively to match image frames within every pair of image sequences (or videos) acquired by a corresponding pair of image-capture devices. As part of the operation, the circuitry 202 may determine a match between the first set of image frames and the second set of image frames based on a determination that the computed second similarity score is above a threshold (for example, 0.9 or above).

Figure 7:
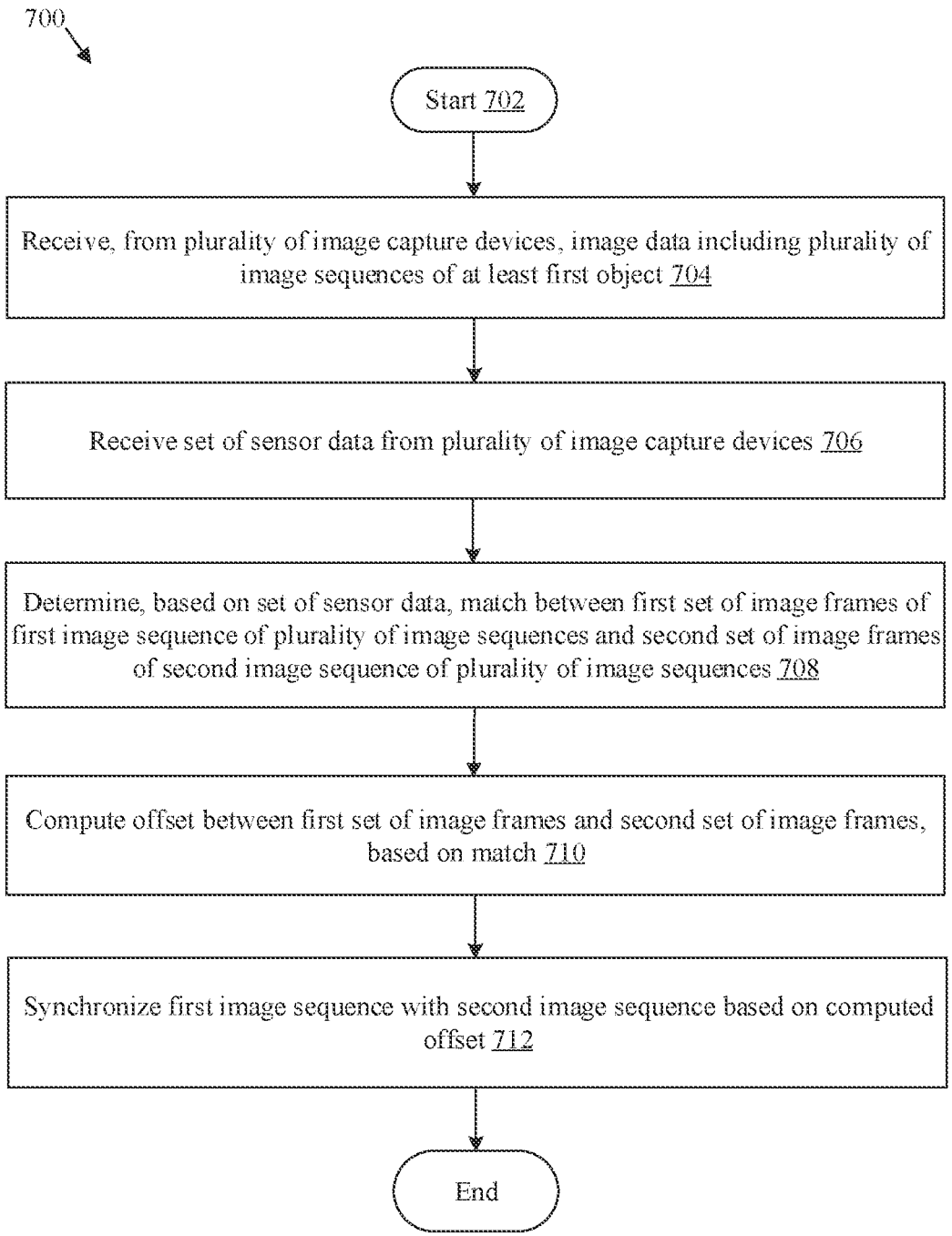
FIG. 7 is a flowchart that illustrates an exemplary method for synchronization of multi-device image data using multimodal sensor data, in accordance with an embodiment of the disclosure.

FIG. 7 is a flowchart that illustrates an exemplary method for synchronization of multi-device image data using multimodal sensor data, in accordance with an embodiment of the disclosure. With reference to FIG. 7, there is shown a flowchart 700. The operations of the flowchart 700 may be executed by a computing system, such as, the system 102 or the circuitry 202. The operations may start at 702 and proceed to 704.

At 704, image data including a plurality of image sequences of at least a first object may be received from the plurality of image-capture devices 104A . . . 104N. In an embodiment, the system 102 may be configured to receive, from the plurality of image-capture devices 104A . . . 104N, image data including the plurality of image sequences (or video clips) of at least the first object. Each image sequence of the plurality of image sequences may correspond to an image-capture device of the plurality of image-capture devices 104A . . . 104N. Each of the plurality of image-capture devices may acquire the plurality of image sequences from a corresponding plurality of viewpoints.

At 706, a set of sensor data may be received from the plurality of image capture devices. In an embodiment, the system 102 may be configured to receive the set of sensor data from the plurality of image-capture devices. Each sensor data of the received set of sensor data may include at least one of an Inertial Measurement Unit (IMU) data and audio data. The IMU data and the audio data may be associated with a duration of acquisition of a corresponding image sequence of the plurality of image sequences.

At 708, a match may be determined between a first set of image frames of a first image sequence of the plurality of image sequences and a second set of image frames of a second image sequence of the plurality of image sequences. In an embodiment, the system 102 may be further configured to determine the match based on the received set of sensor data. Details of the match determination are provided in FIG. 5 and FIG. 6, for example.

At 710, an offset may be computed between the first set of image frames and the second set of image frames. In an embodiment, the system 102 may be configured to compute the offset between the first set of image frames and the second set of image frames.

At 712, the first image sequence may be synchronized with the second image sequence based on the computed offset. In an embodiment, the system 102 may be configured to synchronize the first image sequence with the second image sequence based on the computed offset. The synchronization may include a shift in a positional identifier of the first set of image frames in the first image sequence with respect to a positional identifier of the second set of image frames in the second image sequence. Control may pass to end.

Although the flowchart 700 is illustrated as discrete operations, such as 702, 704, 706, 808, 710, and 712, the disclosure may not be so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a system (e.g., system 102), for synchronization of multi-device image data using multimodal sensor data. The instructions may cause the machine and/or computer to perform operations that include receiving, from a plurality of image-capture devices, image data comprising a plurality of image sequences of at least a first object. Each image sequence of the plurality of image sequences may correspond to an image-capture device of the plurality of image-capture devices. The operation may further include receiving a set of sensor data from the plurality of image-capture devices. Each sensor data of the received set of sensor data may include at least one of an Inertial Measurement Unit (IMU) data and audio data and is associated with a duration of acquisition of a corresponding image sequence of the plurality of image sequences. The operation may further include determining a match between a first set of image frames of a first image sequence of the plurality of image sequences and a second set of image frames of a second image sequence of the plurality of image sequences, based on the received set of sensor data. The operation may further include computing an offset between the first set of image frames and the second set of image frames and synchronizing the first image sequence with the second image sequence based on the computed offset.

Certain embodiments of the disclosure may be found in the system and a method for synchronization of multi-device image data using multimodal sensor data. Various embodiments of the disclosure may provide the system 102 (FIG. 1) that may include the circuitry 202 (FIG. 2) communicatively coupled to the plurality of image-capture devices 104A . . . 104N 104A . . . 104N (FIG. 1). The circuitry 202 may be configured to receive, from the plurality of image-capture devices 104A . . . 104N 104A . . . 104N, image data comprising a plurality of image sequences 106A . . . 106N of at least a first object. Each image sequence of the plurality of image sequences 106A . . . 106N may correspond to an image-capture device of the plurality of image-capture devices 104A . . . 104N. The circuitry 202 may further receive a set of sensor data from the plurality of image-capture devices 104A . . . 104N. Each sensor data of the received set of sensor data may include at least one of an Inertial Measurement Unit (IMU) data and audio data and may be associated with a duration of acquisition of a corresponding image sequence of the plurality of image sequences 106A . . . 106N. The circuitry 202 may be configured to determine, based on the received set of sensor data, a match between a first set of image frames of a first image sequence of the plurality of image sequences 106A . . . 106N and a second set of image frames of a second image sequence of the plurality of image sequences 106A . . . 106N. Thereafter, the circuitry 202 may be configured to compute an offset between the first set of image frames and the second set of image frames, based on the match and synchronize the first image sequence with the second image sequence based on the computed offset.

In an embodiment, the circuitry 202 may be further configured to control the plurality of image-capture devices 104A . . . 104N 104A . . . 104N to acquire the plurality of image sequences 106A . . . 106N 106A . . . 106N from a corresponding plurality of viewpoints. In an embodiment, the system 102 may further include a multi-camera rig (as shown in FIG. 3, for example) which includes a support structure on which the plurality of image-capture devices 104A . . . 104N is mounted.

In an embodiment, the circuitry 202 may be further configured to extract, from the received set of sensor data, a first IMU data corresponding to the first image sequence and a second IMU data corresponding to the second image sequence. The circuitry 202 may be further configured to generate a first spectrogram of the first IMU data and a second spectrogram of the second IMU data. The generated first spectrogram and the generated second spectrogram may be filtered based on a first two-dimensional (2D) diamond kernel or a first masked max filter to generate a first filter result and a second filter result, respectively. The first filter result and the second filter result may be converted to a first list of one of time-domain or frequency-domain values and a second list of one of time-domain or frequency-domain values, respectively. Thereafter, the circuitry 202 may be configured to generate a first lookup key with first offset values to neighboring list elements of the first list and a second lookup key with second offset values to neighboring list elements of the second list. In an embodiment, the circuitry may be further configured to determine first key-based matches between the generated first lookup key with first offset values and the generated second lookup key with second offset values. A first similarity score may be computed for a pair of the first set of image frames and the second set of image frames. The computation may be based on the determined first key-based matches. Thereafter, the match between the first set of image frames and the second set of image frames may be determined based on a determination that the computed first similarity score is above a threshold.

In an embodiment, the circuitry 202 may be further configured to extract, from the received set of sensor data, a first audio data corresponding to the first image sequence and a second audio data corresponding to the second image sequence. The circuitry 202 may be further configured to generate a first sonogram of the first audio data and a second sonogram of the second audio data. The generated first sonogram and the generated second sonogram may be filtered based on a second two-dimensional (2D) diamond kernel or a second masked max filter to generate a third filter result and a fourth filter result, respectively. The third filter result and the fourth filter result may be converted to a third list of one of time-domain or frequency-domain values and a fourth list of one of time-domain or frequency-domain values, respectively. Thereafter, the circuitry 202 may be configured to generate a third lookup key with third offset values to neighboring list elements of the third list and a fourth lookup key with fourth offset values to neighboring list elements of the fourth list. In an embodiment, the circuitry 202 may be further configured to determine second key-based matches between the generated third lookup key with third offset values and the generated fourth lookup key with fourth offset values. A second similarity score may be computed for a pair of the first set of image frames and the second set of image frames. The computation may be based on the determined second key-based matches. Thereafter, the match between the first set of image frames and the second set of image frames may be determined based on a determination that the computed second similarity score is above a threshold.

In an embodiment, the computed offset may correspond to a number of frames by which a positional identifier of a first image frame of the first set of image frames precedes or succeeds a positional identifier of a second frame of the second set of image frames.

In an embodiment, the synchronization may include a shift in a positional identifier of the first set of image frames in the first image sequence with respect to a positional identifier of the second set of image frames in the second image sequence. In an embodiment, the synchronization may include a down-sampling of at least one of the first image sequence or the second image sequence, such that a positional identifier of the first set of image frames matches with a positional identifier of the second set of image frames.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A system, comprising:
   circuitry configured to:
   receive, from a plurality of image-capture devices, image data comprising a plurality of image sequences of a first object, wherein each image sequence of the plurality of image sequences corresponds to an image-capture device of the plurality of image-capture devices;
   receive a set of sensor data from the plurality of image-capture devices,
      wherein each sensor data of the received set of sensor data comprises at least one of an Inertial Measurement Unit (IMU) data or audio data, and
      each sensor data of the received set of sensor data is associated with a duration of acquisition of a corresponding image sequence of the plurality of image sequences;
   extract, from the received set of sensor data, a first IMU data corresponding to a first image sequence of the plurality of image sequences;
   generate a first spectrogram of the first IMU data;
   filter the generated first spectrogram based on one of a first two-dimensional (2D) diamond kernel or a first masked max filter to generate a first filter result;
   convert the first filter result to a first list of one of time-domain values or frequency-domain values;
   generate a first lookup key with first offset values to neighboring list elements of the first list;
   determine, based on the generated first lookup key, a match between a first set of image frames of the first image sequence and a second set of image frames of a second image sequence of the plurality of image sequences;
   compute an offset between the first set of image frames and the second set of image frames, based on the match; and
   synchronize the first image sequence with the second image sequence based on the computed offset.

2. The system according to claim 1, wherein the circuitry is further configured to control the plurality of image-capture devices to acquire the plurality of image sequences from a corresponding plurality of viewpoints.

3. The system according to claim 1, further comprising a multi-camera rig which includes a support structure on which the plurality of image-capture devices is mounted.

4. The system according to claim 1, wherein the circuitry is further configured to:
   extract, from the received set of sensor data, a second IMU data corresponding to the second image sequence;
   generate a second spectrogram of the second IMU data;
   filter the generated second spectrogram based on one of the first 2D diamond kernel or the first masked max filter to generate a second filter result;
   convert the second filter result to a second list of one of the time-domain values or the frequency-domain values; and
   generate a second lookup key with second offset values to neighboring list elements of the second list.

5. The system according to claim 4, wherein the circuitry is further configured to:
   determine first key-based matches between the generated first lookup key with the first offset values and the generated second lookup key with the second offset values;
   compute a first similarity score for a pair of the first set of image frames and the second set of image frames,
      wherein the first similarity score is computed based on the determined first key-based matches; and
   determine the match between the first set of image frames and the second set of image frames based on a determination that the computed first similarity score is above a threshold.

6. The system according to claim 1, wherein the circuitry is further configured to:
extract, from the received set of sensor data, a first audio data corresponding to the first image sequence;
generate a first sonogram of the first audio data;
filter the generated first sonogram based on one of a second two-dimensional (2D) diamond kernel or a second masked max filter to generate a third filter result;
convert the third filter result to a third list of one of the time-domain values or the frequency-domain values; and
generate a third lookup key with third offset values to neighboring list elements of the third list.

7. The system according to claim 6, wherein the circuitry is further configured to:
extract, from the received set of sensor data, a second audio data corresponding to the second image sequence;
generate a second sonogram of the second audio data;
filter the generated second sonogram based on one of the second 2D diamond kernel or the second masked max filter to generate a fourth filter result;
convert the fourth filter result to a fourth list of one of the time-domain values or the frequency-domain values; and
generate a fourth lookup key with fourth offset values to neighboring list elements of the fourth list.

8. The system according to claim 7, wherein the circuitry is further configured to:
determine second key-based matches between the generated third lookup key with the third offset values and the generated fourth lookup key with the fourth offset values;
compute a second similarity score for a pair of the first set of image frames and the second set of image frames, wherein the second similarity score is computed based on the determined second key-based matches; and
determine the match between the first set of image frames and the second set of image frames based on a determination that the computed second similarity score is above a threshold.

9. The system according to claim 1, wherein the computed offset corresponds to a number of frames by which a positional identifier of a first image frame of the first set of image frames one of precedes or succeeds a positional identifier of a second frame of the second set of image frames.

10. The system according to claim 1, wherein the synchronization comprises a shift in a positional identifier of the first set of image frames in the first image sequence with respect to a positional identifier of the second set of image frames in the second image sequence.

11. The system according to claim 1, wherein the synchronization comprises a down-sampling of at least one of the first image sequence or the second image sequence, such that a positional identifier of the first set of image frames matches with a positional identifier of the second set of image frames.

12. A method, comprising:
receiving, from a plurality of image-capture devices, image data comprising a plurality of image sequences of a first object, wherein each image sequence of the plurality of image sequences corresponds to an image-capture device of the plurality of image-capture devices;
receiving a set of sensor data from the plurality of image-capture devices,
wherein each sensor data of the received set of sensor data comprises at least one of an Inertial Measurement Unit (IMU) data or audio data, and
each sensor data of the received set of sensor data is associated with a duration of acquisition of a corresponding image sequence of the plurality of image sequences;
extracting, from the received set of sensor data, a first IMU data corresponding to a first image sequence of the plurality of image sequences;
generating a first spectrogram of the first IMU data;
filtering the generated first spectrogram based on one of a first two-dimensional (2D) diamond kernel or a first masked max filter to generate a first filter result;
converting the first filter result to a first list of one of time-domain values or frequency-domain values;
generating a first lookup key with first offset values to neighboring list elements of the first list;
determining, based on the generated first lookup key, a match between a first set of image frames of the first image sequence and a second set of image frames of a second image sequence of the plurality of image sequences;
computing an offset between the first set of image frames and the second set of image frames, based on the match; and
synchronizing the first image sequence with the second image sequence based on the computed offset.

13. The method according to claim 12, further comprising controlling the plurality of image-capture devices to acquire the plurality of image sequences from a corresponding plurality of viewpoints.

14. The method according to claim 12, further comprising:
extracting, from the received set of sensor data, a second IMU data corresponding to the second image sequence;
generating a second spectrogram of the second IMU data;
filtering the generated second spectrogram based on one of the first 2D diamond kernel or the first masked max filter to generate a second filter result;
converting the second filter result to a second list of one of the time-domain values or the frequency-domain values; and
generating a second lookup key with second offset values to neighboring list elements of the second list.

15. The method according to claim 14, further comprising:
determining first key-based matches between the first lookup key with the first offset values and the second lookup key with the second offset values;
computing a first similarity score for a pair of the first set of image frames and the second set of image frames, wherein the first similarity score is computed based on the determined first key-based matches; and
determining the match between the first set of image frames and the second set of image frames based on a determination that the computed first similarity score is above a threshold.

16. The method according to claim 12, further comprising:
extracting, from the received set of sensor data, a first audio data corresponding to the first image sequence;
extracting, from the received set of sensor data, a second audio data corresponding to the second image sequence;

generating a first sonogram of the first audio data and a second sonogram of the second audio data;

filtering the first sonogram based on one of a second two-dimensional (2D) diamond kernel or a second masked max filter to generate a third filter result and the second sonogram based on one of the second 2D diamond kernel or the second masked max filter to generate a fourth filter result;

converting the third filter result to a third list of one of the time-domain values or the frequency-domain values and the fourth filter result to a fourth list of one of the time-domain values or the frequency-domain values; and generating a third lookup key with third offset values to neighboring list elements of the third list and a fourth lookup key with fourth offset values to neighboring list elements of the fourth list.

17. The method according to claim 16, further comprising:

determining second key-based matches between the third lookup key with the third offset values and the fourth lookup key with the fourth offset values;

computing a second similarity score for a pair of the first set of image frames and the second set of image frames, wherein the second similarity score is computed based on the determined second key-based matches; and determining the match between the first set of image frames and the second set of image frames based on a determination that the computed second similarity score is above a threshold.

18. The method according to claim 12, wherein the synchronization comprises a shift in a positional identifier of the first set of image frames in the first image sequence with respect to a positional identifier of the second set of image frames in the second image sequence.

19. A non-transitory computer-readable medium having stored thereon, computer-executable instructions that when executed by a system, causes the system to execute operations, the operations comprising:

receiving, from a plurality of image-capture devices, image data comprising a plurality of image sequences of a first object, wherein each image sequence of the plurality of image sequences corresponds to an image-capture device of the plurality of image-capture devices;

receiving a set of sensor data from the plurality of image-capture devices,
wherein each sensor data of the received set of sensor data comprises at least one of an Inertial Measurement Unit (IMU) data or audio data, and
each sensor data of the received set of sensor data is associated with a duration of acquisition of a corresponding image sequence of the plurality of image sequences;

extracting, from the received set of sensor data, a first IMU data corresponding to a first image sequence of the plurality of image sequences;

generating a first spectrogram of the first IMU data;

filtering the generated first spectrogram based on one of a first two-dimensional (2D) diamond kernel or a first masked max filter to generate a first filter result;

converting the first filter result to a first list of one of time-domain values or frequency-domain values;

generating a first lookup key with first offset values to neighboring list elements of the first list;

determining, based on the generated first lookup key, a match between a first set of image frames of the first image sequence and a second set of image frames of a second image sequence of the plurality of image sequences;

computing an offset between the first set of image frames and the second set of image frames, based on the match; and synchronizing the first image sequence with the second image sequence based on the computed offset.

20. A system, comprising:
circuitry configured to:
receive, from a plurality of image-capture devices, image data that comprises a plurality of image sequences of a first object, wherein each image sequence of the plurality of image sequences corresponds to an image-capture device of the plurality of image-capture devices;

receive a set of sensor data from the plurality of image-capture devices,
wherein each sensor data of the received set of sensor data comprises at least one of an Inertial Measurement Unit (IMU) data or audio data, and
each sensor data of the received set of sensor data is associated with a duration of acquisition of a corresponding image sequence of the plurality of image sequences;

extract, from the received set of sensor data, a first audio data corresponding to a first image sequence;

generate a sonogram of the first audio data;

filter the generated sonogram based on one of a two-dimensional (2D) diamond kernel or a masked max filter to generate a filter result;

convert the filter result to a list of one of time-domain values or frequency-domain values;

generate a lookup key with offset values to neighboring list elements of the list;

determine, based on the generated lookup key, a match between a first set of image frames of the first image sequence and a second set of image frames of a second image sequence of the plurality of image sequences;

compute an offset between the first set of image frames and the second set of image frames, based on the match; and synchronize the first image sequence with the second image sequence based on the computed offset.

* * * * *